US008123256B1

(12) United States Patent
Hartman

(10) Patent No.: US 8,123,256 B1
(45) Date of Patent: Feb. 28, 2012

(54) SAFETY LOCK FOR CAM LOCK FITTING

(76) Inventor: Jeffrey Hartman, Mobile, AL (US)

( * ) Notice: Subject to any disclaimer, the term of this patent is extended or adjusted under 35 U.S.C. 154(b) by 115 days.

(21) Appl. No.: 12/799,085

(22) Filed: Apr. 19, 2010

(51) Int. Cl.
*F16L 55/00* (2006.01)
(52) U.S. Cl. .......................................... 285/85; 285/312
(58) Field of Classification Search .................. 285/88, 285/85, 82, 83, 312
See application file for complete search history.

(56) References Cited

U.S. PATENT DOCUMENTS

| | | | |
|---|---|---|---|
| 3,860,274 A | 1/1975 | Ledstrom et al. | |
| 4,222,593 A * | 9/1980 | Lauffenburger | 285/85 |
| 4,269,215 A | 5/1981 | Odar | |
| 4,538,632 A | 9/1985 | Vogl | |
| 5,234,017 A | 8/1993 | Aflin et al. | |
| 5,595,217 A | 1/1997 | Gillen et al. | |
| 5,863,079 A | 1/1999 | Donais et al. | |
| 6,095,190 A | 8/2000 | Wilcox et al. | |

* cited by examiner

*Primary Examiner* — Aaron Dunwoody
(74) *Attorney, Agent, or Firm* — George L Williamson

(57) ABSTRACT

Method and apparatus for a safety lock for a cam lock fitting contained in a housing mounted onto the outside of the cam lock fitting so that the housing is in close proximity to the cam lever so that when the cam lock fitting is pressurized and the lever is in a down position a pin can extend from the housing so as to secure the lever in a downward position and therefore prevent operation or release of the male and the female portions of the fitting. The housing has a piston therein which moves along a bore so that the piston can be moved by the pressure of fluid contained inside the cam lock fitting so that in a low pressure condition the pin is retracted so that the cam lever can then be raised. The pin is connected to the piston with an L-shaped arm which has a pivot point so that when the piston is in the down position the pin is in a retracted position. When the coupling is pressurized the piston moves upwardly along the bore so that the pin is extended over the arm in order to prevent the arm from being moved to the open position and thereby allowing the male end to be removed from the female end of the cam lock fitting.

8 Claims, 3 Drawing Sheets

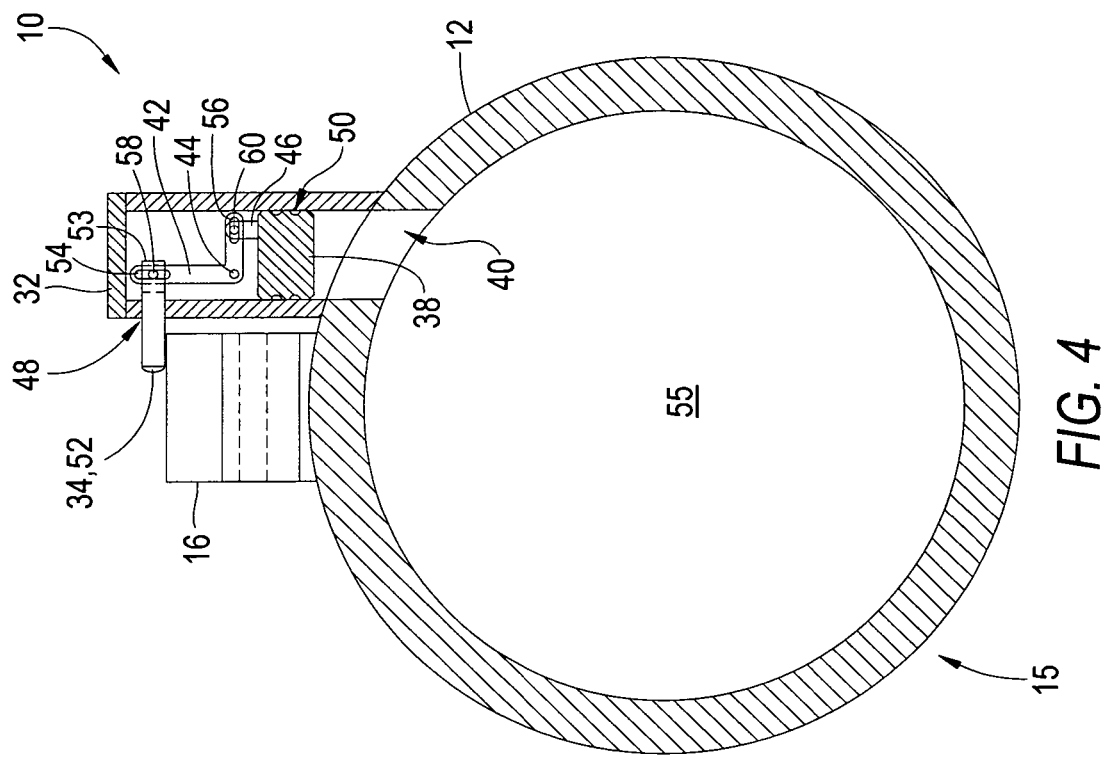
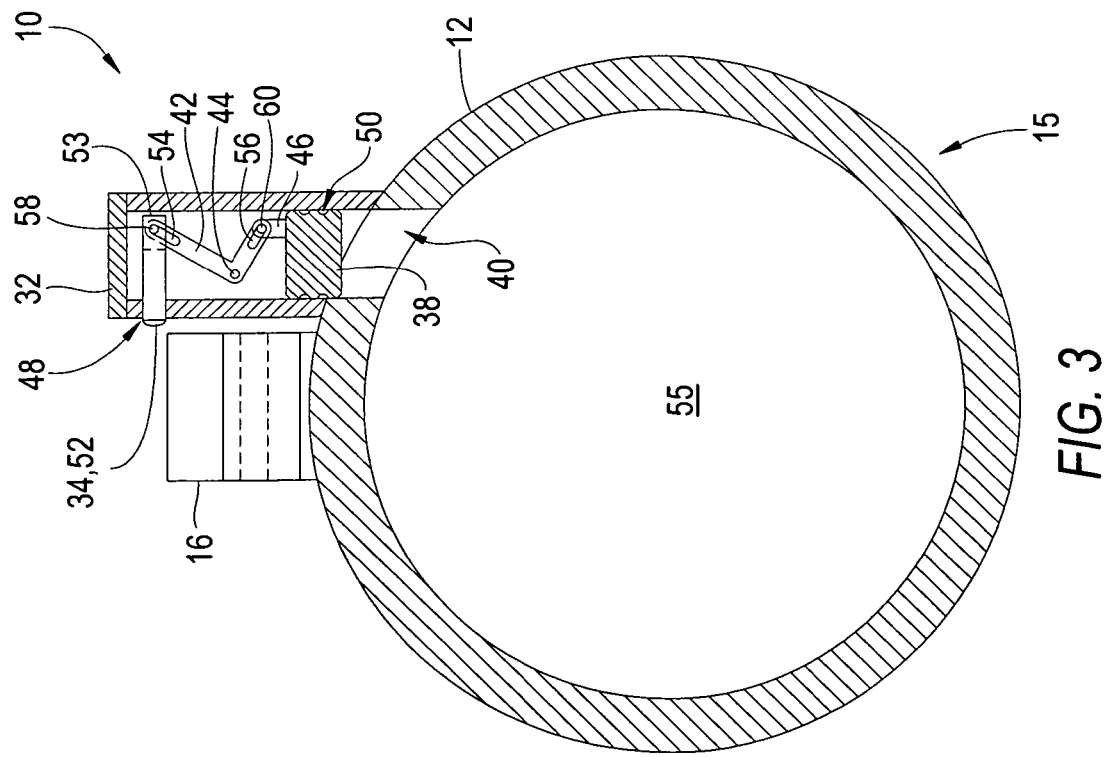

SAFETY LOCK FOR CAM LOCK FITTING

BACKGROUND OF THE INVENTION

1. Field of the Invention

The present invention relates generally to cam lock fittings and, more particularly, is concerned with a safety lock for a cam lock fitting.

2. Description of the Prior Art

Cam lock fittings have been described in the prior art. However, none of the prior art devices disclose the unique features of the present invention. U.S. Pat. No. 6,095,190 to Wilcox, et al., dated Aug. 1, 2000, disclosed a coupling with a female half having internal pressure relief. U.S. Pat. No. 5,863,079 to Donais, et al., dated Jan. 26, 1999, disclosed a quick-connect, disconnect coupling. U.S. Pat. No. 5,595,217 to Gillen, et al., dated Jan. 21, 1997, disclosed a dry break coupling assembly with a cam locking connection system. U.S. Pat. No. 5,234,017 to Aflin, et al., dated Aug. 10, 1993, disclosed a restrictor valve for metered liquid dispensing system. U.S. Pat. No. 4,538,632 to Vogl dated Sep. 3, 1985, disclosed a shut-off valve for a fuel truck or tanker drain off having down spouts. U.S. Pat. No. 4,269,215 to Odar dated May 26, 1981, disclosed a vapor flow control valve. U.S. Pat. No. 3,1860,274 to Ledstrom, et al., dated Jan. 14, 1975 disclosed a pipe coupling. While these devices related to cam lock fittings may be suitable for the purposes for which they were designed, they would not be as suitable for the purposes of the present invention, as hereinafter described.

SUMMARY OF THE PRESENT INVENTION

The present invention discloses a safety lock for a cam lock fitting contained in a housing mounted onto the outside of the cam lock fitting so that the housing is in close proximity to the cam lever so that when the cam lock fitting is pressurized and the lever is in a down position a pin can extend from the housing so as to secure the lever in a downward position and therefore prevent operation or release of the male and the female portions of the fitting. The housing has a piston therein which moves along a bore so that the piston can be moved by the pressure of fluid contained inside the cam lock fitting so that in a low pressure condition the pin is retracted so that the cam lever can then be raised. The pin is connected to the piston with an L-shaped arm which has a pivot point so that when the piston is in the down position the pin is in a retracted position. When the coupling is pressurized the piston moves upwardly along the bore so that the pin is extended over the arm in order to prevent the arm from being moved to the open position and thereby allowing the male end to be removed from the female end of the cam lock fitting.

An object of the present invention is to provide a safety lock on a cam lock fitting so as to prevent overflows of fluid when the cam lock fitting is opened. A further object of the present invention is to provide a safety lock on the female end of a cam lock fitting. A further object of the present invention is to provide a safety lock which can be easily operated as a part of the normal operation of a cam lock fitting. A further object of the present invention is to provide a safety lock which will be locked when the cam lock fitting is pressurized. A further object of the present invention is to provide a safety lock on a cam lock fitting which will prevent inadvertent pressurized discharges from a hose connected to the cam lock fitting.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIGS. 3 and 4 are cross section views of the present invention.

LIST OF REFERENCE NUMERALS

Figure 1:
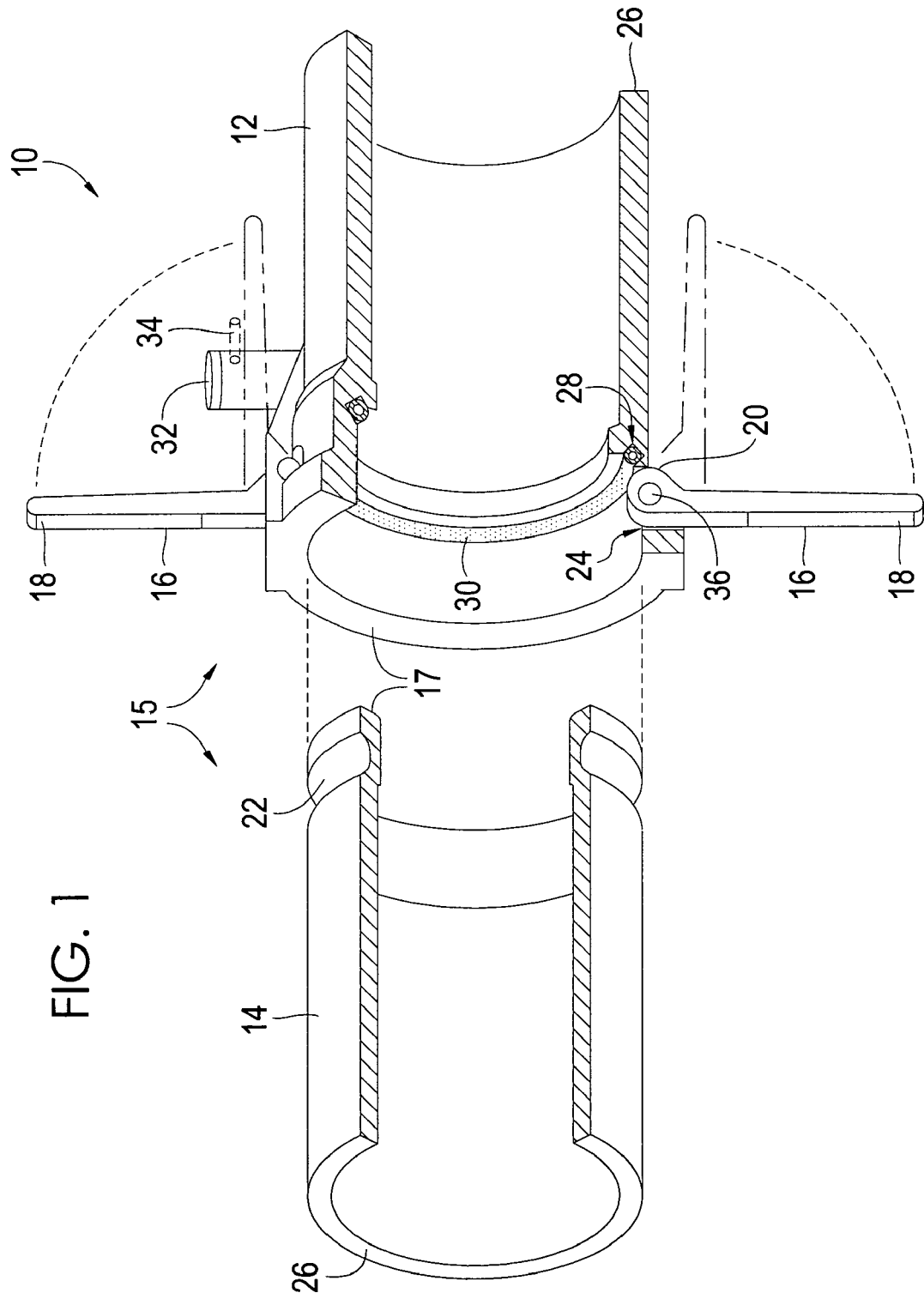
FIG. 1 is perspective view of the present invention.

With regard to reference numerals used, the following numbering is used throughout the drawings.

10 present invention
12 female end
14 male end
15 cam lock fitting
16 cam lever
17 end
18 lever portion
20 cam portion
22 groove
24 opening
26 wall of cam lock fitting
28 recess
30 O-ring
32 housing
34 pin
36 axle
38 piston
40 bore
42 L-shaped arm
44 axle
46 extension arm
48 opening
50 O-ring groove
52 end
53 end
54 slot
55 internal
56 slot
58 pin
60 pin

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims. FIGS. 1-4 illustrate the present invention wherein a safety lock for a cam lock fitting is disclosed.

Figure 2:
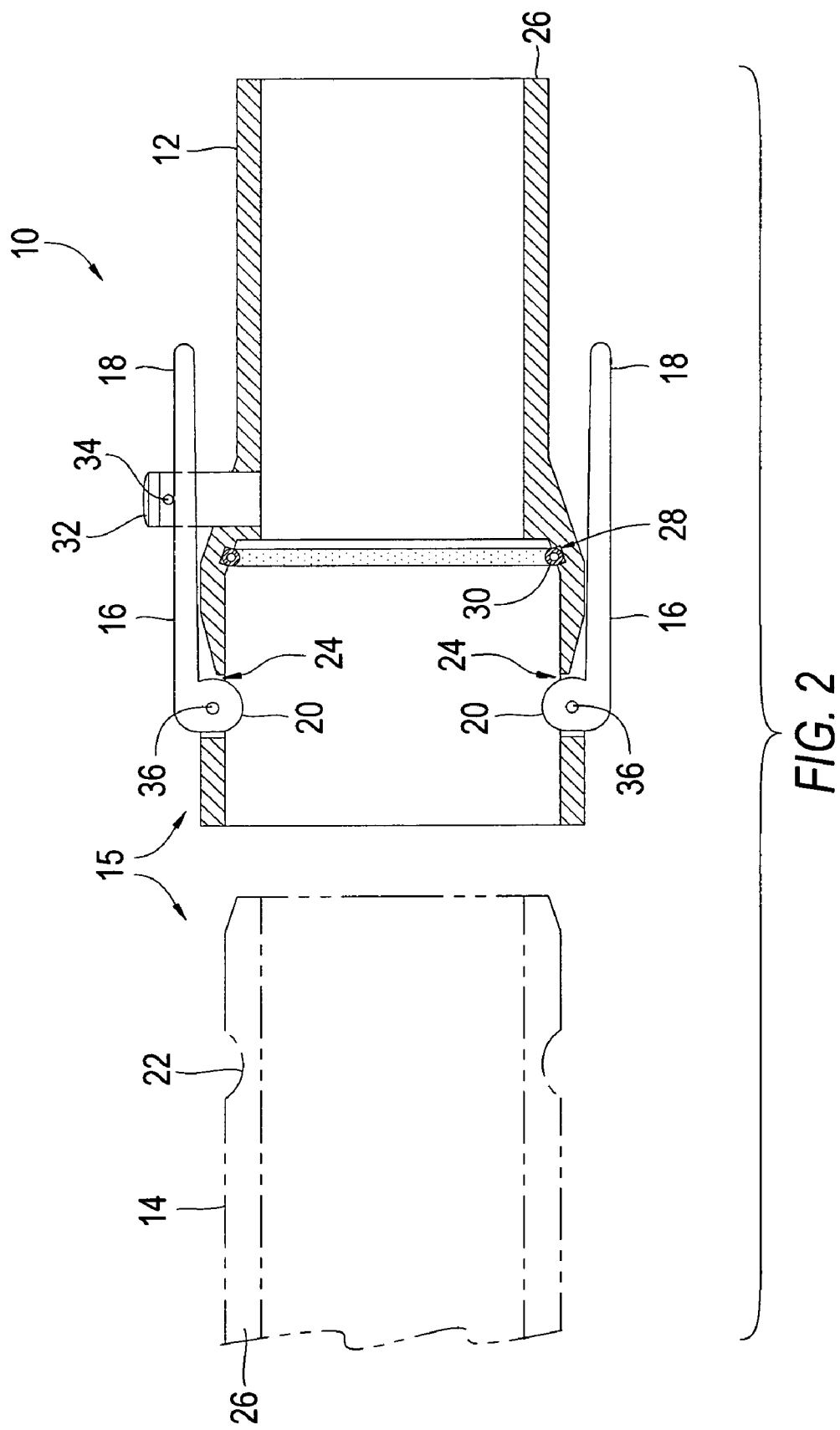
FIG. 2 is a cross section view of the present invention.

Turning to FIGS. 1 and 2, therein is shown the present invention 10 showing a cam lock fitting 15 having a female end portion 12 and a male end portion 14 each having end 17. The female portion 12 has a pair of cam levers or ears 16, each having a lever portion 18 and a cam portion 20 thereon, which cam portion locks the female end 12 to the male end 14 by seating the cam portion 20 of the female portion within a groove 22 of the male portion as the two portions are joined. The cam portion 20 projects through an opening 24 in the wall 26 near the end 17 of the female portion 12 as the ears 16 pivot on axles 36. Also shown on the female portion 12 is a recess 28 having an O-ring seal 30 therein wherein the recess extends entirely around the periphery of the female portion. Also shown is a means for a safety lock assembly contained in a housing 32 mounted onto the outside surface of the female portion 12 so that the housing 32 is in close proximity to the arm 16 so that when the arm is in a down position an extendable and retractable arm or pin 34 can extend from the housing directly over the arm so as to safely lock the arm in a downward position to thereby prevent operation of the arm and the opening or release of the male 14 and the female portions 12 of the cam lock fitting 15.

Turning to FIGS. 3 and 4, therein is shown the present invention 10 showing a the female portion 12 of a cam lock fitting 15 along with its associated cam levers or ear 16 with the cam lock fitting. FIG. 3 shows the fitting 15 in the unpressurized condition and FIG. 4 shows the fitting in the pressurized condition. It can be seen that housing 12 has a piston 38 therein which moves along a bore 40 so that the piston is fluidly connected to and can be influenced by and moved by the pressure of fluid contained internal 55 the female portion 12 of the cam lock fitting 15 so that in a low pressure position, as shown in FIG. 3, the pin 34 is retracted so that the arm 16 can then be raised and the cam lock fitting opened. Pin 34 is connected to the piston 38 by means of an elbow or L-shaped arm 42 which arm pivots about an axle 44 or a pivot point disposed in its base, i.e., the junction point of its two arms, so that when the piston in the down position the pin 34 is in a retracted position so that the arm 16 can be opened. The L-shaped arm 42 has slots 54, 56 near the end of each of its arms which slots each receive a pin 58, 60 which thereby adapts the arm 42 to be connected to the pin 34 and piston 38. Pin 58 is disposed on end 53 of pin 34 and pin 60 is connected to extension arm 46 on piston 38.

Turning to FIG. 4, therein is shown the cam lock fitting 15 in the pressurized condition so that the piston 38 moves upwardly along the bore 40 so that the pin 34 is extended to a point over the arm 16 in order to prevent the arm from being moved to the open position and thereby allowing the cam lock fitting to be opened by allowing the male portion to be removed from the female portion of the coupling.

By way of additional general explanation, the present invention discloses a housing 32 mounted on a surface contiguously to cam lever 16 wherein the housing has a piston 38 which moves in a bore 40 contained in the housing so that when fluid in the cam lock fitting 15 is pressurized the piston moves to a first position and when fluid in the coupling is unpressurized the piston relaxes into a second position. The piston 38 has an extension arm 46 thereon which connects to an L-shaped arm 42 connected to a locking pin 34 so that when the piston moves up or down the locking pin is moved in a horizontal direction so that in a first position the first end 52 of the locking pin moves over the cam lever 16 so that the cam lever cannot be opened thereby assuring that the male portion of the cam lock fitting cannot be unlocked from its mating female portion; likewise when the piston moves to its unpressurized position the locking pin is retracted into the housing so that the cam lever can then be opened thereby allowing the male portion to be separated from its mating female portion. The lock pin 34 is horizontally movable through an opening 48 contained in the housing 32. The piston 38 also has at least one groove 50 therein for receiving an O-ring so as to prevent fluid from passing by the piston as it moves within its bore 40. Also note that the locking pin has a first end 52 and a second end 53. The user can push inwardly on the end 52 of the lock pin 34 to move it from its extended position to its retracted position.

I claim:

1. A safety lock for a cam lock fitting, comprising:
   a) male and female conduits adapted for being connected to each other, said male conduit having an end thereon and an external circumferential groove adjacent said end, said female conduit having an end thereon and internal circular recess disposed therein adjacent said female end, a seal being disposed in said recess, wherein said end of said male conduit contacts said seal of said female conduit when said male and female conduits are connected, first and second cam levers being disposed on opposite sides of said female conduit each having a lever portion and a cam portion wherein each said cam portion of said cam levers is adapted to rotate through a wall of said female conduit portion and into said groove so as to removably join said male conduit to said female conduit, wherein each said cam lever has a first closed position when said male and female conduits are joined together and a second open position when said male and female conduits are disconnected from each other;
   b) a housing being disposed external said female conduit containing a bore adjacent said first cam lever;
   c) said housing containing a bore communicating with said bore in said female wall extending into an interior of said female conduit;
   d) a piston slidable within said bores, an inward surface of said piston being exposed to pressure within said female conduit;
   e) a chamber formed between an outward surface of said piston and a top closure of said bore;
   f) a locking pin extending out through a side wall of said housing from said chamber and bore, said locking pin being slidable between a deployed position overlapping said lever portion when said first cam lever is in said closed position effectively blocking said first cam lever from being rotated into an open position and a retracted position substantially fully within said chamber allowing said first cam lever to be rotated into said open position; and
   g) a linkage between said locking pin and said piston adapted to move said locking pin into said deployed position when there is sufficient fluid pressure within said female conduit to move said piston outwardly thereby urging said locking pin into said locking position, said locking pin having a distal end which is adapted to be pushed to retract said locking pin when pressure drops in said female conduit and said piston moves inwardly, thereby unlocking said first cam lever.

2. The safety lock of claim 1, wherein said seal is an O-ring mounted in said recess.

3. The safety lock of claim 1, wherein said linkage comprises an L-shaped arm having first and second legs at right angles to each other, each leg having a distal end, wherein said distal end of said first leg is adapted for connection to said locking pin and said distal end of said second leg is adapted for connection to said piston so that said locking pin moves in response to movement of said piston.

4. The safety lock of claim 3, wherein said first and second legs of said L-shaped arm pivot about a fixed pin mounted within said chamber, and the distal ends of said first and second legs are provided with slots to engage a pivot pin on said locking pin and a pivoting pin mounted on an arm extending from said outward surface of said piston, respectively.

5. A method for making a safety lock for a cam lock fitting, comprising the steps of:
 a) providing a cam lock fitting having male and female conduits adapted for being connected to each other, the male conduit having an end thereon and an external circumferential groove adjacent the end, the female conduit having an end thereon and an internal circular recess disposed therein adjacent said female end, a seal being disposed in the recess, wherein the end of the male conduit contacts the seal of the female conduit when the male and female conduits are connected, providing first and second cam levers on opposite sides of the female conduit each having a lever portion and a cam portion wherein each cam portion of the cam levers is adapted to rotate through a wall of the female conduit and into the groove so as to removably join the male conduit to the female conduit, wherein each cam lever has a first closed position when the male and female conduits are joined together and a second open position when the male and female conduits are disconnected from each other;
 b) providing a housing on an external surface of the female conduit adjacent the first cam lever;
 c) said housing containing a bore communicating with a bore in said female conduit wall extending into an interior of said female conduit;
 d) providing a piston slidable within said bores, an inward surface of said piston being exposed to pressure within said female conduit;
 e) providing a chamber formed between an outward surface of said piston and a top closure of said bore;
 f) providing a locking pin extending out through a side wall of said housing from said chamber and bores, said locking pin being slidable between a deployed position overlapping said lever portion when said first cam lever is in said closed position effectively blocking said first cam lever from being rotated into an open position and a retracted position substantially fully within said chamber allowing said first cam lever to be rotated into said open position; and
 g) providing a linkage between said locking pin and said piston adapted to move said locking pin into said deployed position when there is sufficient fluid pressure within said female conduit to move said piston outwardly thereby urging said locking pin into said locking position, said locking pin having a distal end which is adapted to be pushed to retract said locking pin when pressure drops in said female conduit, thereby unlocking said first cam lever.

6. The method of claim 5, wherein said seal is an O-ring mounted in said recess.

7. The method of claim 5, wherein said linkage comprises an L-shaped arm having first and second legs at right angles to each other, wherein a distal end of said first leg is adapted for connection to said locking pin and a distal end of said second leg is adapted for connection to the piston so that said locking pin moves in response to movement of the piston.

8. The method of claim 7, wherein said first and second legs of said L-shaped arm pivot about a fixed pin mounted within said chamber, and the distal ends of said first and second legs are provided with slots to engage a pivot pin on said locking pin and a pivoting pin mounted on an arm extending from said outward surface of said piston, respectively.

\* \* \* \* \*